United States Patent
Suzuki et al.

(10) Patent No.: US 9,989,361 B2
(45) Date of Patent: Jun. 5, 2018

(54) ANOMALOUS TIDE LEVEL FLUCTUATION SENSING DEVICE, ANOMALOUS TIDE LEVEL FLUCTUATION SENSING METHOD, AND ANOMALOUS TIDE LEVEL FLUCTUATION SENSING PROGRAM

(71) Applicant: NEC Corporation, Minato-ku, Tokyo (JP)

(72) Inventors: Tetsuaki Suzuki, Kanagawa (JP); Taizou Matsunaga, Aichi (JP); Kenshirou Katsura, Aichi (JP)

(73) Assignee: NEC CORPORATION, Tokyo (JP)

( * ) Notice: Subject to any disclaimer, the term of this patent is extended or adjusted under 35 U.S.C. 154(b) by 183 days.

(21) Appl. No.: 14/915,950

(22) PCT Filed: Aug. 21, 2014

(86) PCT No.: PCT/JP2014/072507
§ 371 (c)(1),
(2) Date: Mar. 2, 2016

(87) PCT Pub. No.: WO2015/045717
PCT Pub. Date: Apr. 2, 2015

(65) Prior Publication Data
US 2016/0203696 A1     Jul. 14, 2016

(30) Foreign Application Priority Data
Sep. 26, 2013  (JP) .................................. 2013-200075

(51) Int. Cl.
G01V 3/00       (2006.01)
G01C 13/00      (2006.01)
(Continued)

(52) U.S. Cl.
CPC ......... *G01C 13/002* (2013.01); *G01C 13/004* (2013.01); *G01F 23/292* (2013.01);
(Continued)

(58) Field of Classification Search
CPC .................................................. E21B 2049/085
(Continued)

(56) References Cited

FOREIGN PATENT DOCUMENTS

JP   H07-243852 A   9/1995
JP   2000-205930 A  7/2000
(Continued)

OTHER PUBLICATIONS

Masahiko Onosato et al., "Development Challenges of Robot Systems for Mitigation of Tsunami Disaster", No. 12-3 Proceedings of the 2012 JSME Conference on Robotics and Mechatronics, Hamamatsu, Japan, May 27-29, 2012, 3 pages, Abstract, cited in JP Office Action.

(Continued)

*Primary Examiner* — Anthony Ho

(57) ABSTRACT

Provided is a technology for sensing anomalous tide level fluctuations to be used to monitor a tsunami, in which an estimated value of a sea surface fluctuation is obtained by conducting statistical processing or testing processing for a physical phenomenon of the tsunami displayed in image information. An anomalous tide level fluctuation sensing device according to this invention is configured to: detect a position of an object or a horizon, which fluctuates in association with a tide level, from within a video; and detect that the position fluctuates in a time cycle different from a time cycle of a tide or an ocean wave.

15 Claims, 8 Drawing Sheets

(51) Int. Cl.
  *G01V 1/38* (2006.01)
  *G06F 17/18* (2006.01)
  *G01F 23/292* (2006.01)
  *G06T 7/246* (2017.01)
  *G08B 21/10* (2006.01)

(52) U.S. Cl.
  CPC ............... *G01V 1/38* (2013.01); *G06F 17/18* (2013.01); *G06T 7/246* (2017.01); *G06T 2207/10016* (2013.01); *G06T 2207/30181* (2013.01); *G08B 21/10* (2013.01); *Y02A 10/41* (2018.01); *Y02A 50/12* (2018.01)

(58) Field of Classification Search
  USPC ............................................................ 702/2
  See application file for complete search history.

(56) References Cited

FOREIGN PATENT DOCUMENTS

| | | |
|---|---|---|
| JP | 2001-041803 A | 2/2001 |
| JP | 2005-063309 A | 3/2005 |
| JP | 2006-170920 A | 6/2006 |
| JP | 2008-072636 A | 3/2008 |
| JP | 2013-181795 A | 9/2013 |

OTHER PUBLICATIONS

Japanese Office Action for JP Application No. 2013-200075 dated Oct. 4, 2017 with English Translation.

International Search Report for PCT Application No. PCT/JP2014/072507, dated Nov. 25, 2014.

English translation of Written opinion for PCT Application No. PCT/JP2014/072507.

"Mechanism for Forecasting a Tsunami", [online], Japan, Meteorological Agency, Internet <URL:http://www.data.jma.go.jp/svd/eqev/data/tsunami/ryoteki.html>.

"Short-wave Ocean Radar", [online], National Institute of Information and Communications Technology, The Okinawa Electromagnetic Technology Center, Internet <URL: http://okinawa.nict.go.jp/LROR/index1.html>, Apr. 2002.

ANOMALOUS TIDE LEVEL FLUCTUATION SENSING DEVICE, ANOMALOUS TIDE LEVEL FLUCTUATION SENSING METHOD, AND ANOMALOUS TIDE LEVEL FLUCTUATION SENSING PROGRAM

This application is a National Stage Entry of PCT/JP2014/072507 filed on Aug. 21, 2014, which claims priority from Japanese Patent Application 2013-200075 filed on Sep. 26, 2013, the contents of all of which are incorporated herein by reference, in their entirety.

TECHNICAL FIELD

This invention relates to an anomalous tide level fluctuation sensing device, an anomalous tide level fluctuation sensing method, and an anomalous tide level fluctuation sensing program, which are capable of sensing a fluctuation equal to or larger than a predicted tide level fluctuation as an anomalous tide level fluctuation.

BACKGROUND ART

In order to predict arrival of a tsunami or the like, a prediction using a tsunami forecast database (Non Patent Document 1) and a prediction using an observation of a wave using an ocean radar (Non Patent Document 2) have been used.

In the prediction using a tsunami forecast database described in Non Patent Document 1, a numerical simulation of a tsunami at each point of occurrence of a tsunami is conducted to predict a scale of the tsunami to reach a coastal area. In the prediction using the ocean radar described in Non Patent Document 2, a reflected wave of a radio wave emitted toward a sea surface is analyzed, and a speed of a wave and how the wave is to spread are estimated, to thereby predict the reaching of the tsunami.

PRIOR ART DOCUMENTS

Non Patent Document

Non Patent Document 1: "Mechanism for Forecasting a Tsunami", [online], Japan Meteorological Agency, Internet <URL: http://www.seisvol.kishou.go.jp/eq/know/tsunami/ryoteki.html>

Non Patent Document 2: "Short-wave Ocean Radar", [online], National Institute of Information and Communications Technology, The Okinawa Electromagnetic Technology Center, Internet <URL: http://okinawa.nict.go.jp/LROR/index1.html>

SUMMARY OF THE INVENTION

Problem to be Solved by the Invention

However, an arrival prediction of a tsunami using the tsunami forecast database described in Non Patent Document 1 is a prediction of an arrival period of the tsunami (an interval between the shortest time period and the longest time period) and a scale thereof (a height of a forecast tsunami) based on simulation results, and it is difficult to grasp an arrival time period and the scale of an individual tsunami in a case of such a tsunami that a plurality of waves are surging.

Further, in the prediction using the ocean radar described in Non Patent Document 2, it is extremely difficult to grasp presence or absence of arrival of a second wave and subsequent waves of a tsunami at a coastal area and a time period of the arrival under a state in which a first wave has reached the coastal area and a reflected wave thereof has occurred.

Key facilities are required to be engaged in recovery work and the like even between a plurality of tsunamis surging in succession, but in cases of using the related-art methods, the arrival time period and the scale of a first wave and subsequent waves of a tsunami fail to be predicted, and it is difficult to restart the recovery work until all the tsunamis are settled down.

This invention relates to a technology for sensing an anomalous tide level fluctuation to be used to monitor a tsunami, and an object thereof is to provide an anomalous tide level fluctuation sensing device, an anomalous tide level fluctuation sensing method, and an anomalous tide level fluctuation sensing program, which are configured to sense a sea surface fluctuation by conducting statistical processing or testing processing for a physical phenomenon of the tsunami displayed in image information.

Means to Solve the Problem

In view of the above-mentioned problems, one aspect of this invention relates to a technology for realizing sensing of a second wave and subsequent waves of a tsunami, which is difficult with the related-art methods, by sensing a height of a horizon or an object exhibiting a positional fluctuation in synchronization with the height of the horizon within an image from within a video of an image pickup device set at a height enough to allow a tide level fluctuation in an offing to be observed as vertical motion of the horizon, and by detecting that the fluctuation in the height has occurred in a cycle different from the tide level fluctuation that occurs due to influence of an ocean wave, a tide, a meteorological condition, and the like, to thereby sense an anomalous tide level fluctuation in the offing without exception, which allows a prediction of arrival of a wave other than a first wave of the tsunami as well.

Further, another aspect of this invention relates to an anomalous tide level fluctuation sensing device, which is configured to: detect a position of an object or a horizon, which fluctuates in association with a tide level, from within a video; and detect that the position fluctuates in a time cycle different from a time cycle of a tide or an ocean wave.

Further, another aspect of this invention relates to an anomalous tide level fluctuation sensing device, which is configured to: detect a position of an object and a position of a horizon, which fluctuate in association with a tide level, from within a video; and detect that any one of the position of the object and the position of the horizon fluctuates in a time cycle different from a time cycle of a tide or an ocean wave.

Further, another aspect of this invention relates to an anomalous tide level fluctuation sensing device, which is configured to: detect a position of an object and a position of a horizon, which fluctuate in association with a tide level, from within a video; and detect that any one of the position of the object and the position of the horizon fluctuates in a time cycle different from a time cycle of a tide or an ocean wave based on a time by using any one of the fluctuation of the position of the object and the fluctuation of the position of the horizon.

Further, another aspect of this invention relates to an anomalous tide level fluctuation sensing device, including: a horizon candidate detecting unit configured to detect a horizon candidate based on horizontal edge information within a frame image; a horizontal edge height tracking unit configured to compare the detected horizon candidate with a past edge height stored in a storage to acquire a horizon coordinate; and a tide height determination unit configured to determine whether or not the horizon coordinate exceeds a maximum height of a horizon at a normal time, which is forecast from an observation result.

Further, another aspect of this invention relates to an anomalous tide level fluctuation sensing method, including: detecting a position of an object or a horizon, which fluctuates in association with a tide level, from within a video; and detecting that the position fluctuates in a time cycle different from a time cycle of a tide or an ocean wave.

Further, another aspect of this invention relates to an anomalous tide level fluctuation sensing program for causing a computer to implement the functions of: detecting a position of an object or a horizon, which fluctuates in association with a tide level, from within a video; and detecting that the position fluctuates in a time cycle different from a time cycle of a tide or an ocean wave.

Effect of the Invention

According to the aspects of this invention, the anomalous tide level fluctuation is sensed without exception, which allows a first wave and subsequent waves of a tsunami to be sensed even when a plurality of tsunamis arrive at a coastal area in succession.

Further advantages and exemplary embodiments of this invention are described below in detail by way of the description and drawings.

MODES FOR EMBODYING THE INVENTION

Now, an anomalous tide level fluctuation sensing device, an anomalous tide level fluctuation sensing method, and an anomalous tide level fluctuation sensing program according to preferred exemplary embodiments of this invention will be described in detail with reference to the accompanying drawings. However, the technical scope of this invention is totally free from limited interpretation according to the exemplary embodiments described below.

First Exemplary Embodiment

Figure 1:
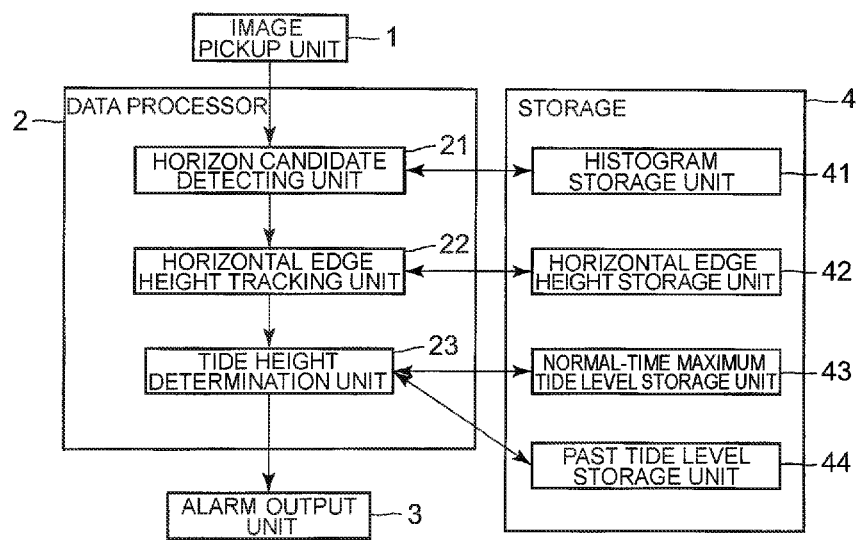
FIG. 1 is a block diagram for illustrating a configuration of an anomalous tide level fluctuation sensing device according to a first exemplary embodiment of this invention.

First, a first exemplary embodiment of this invention is described. FIG. 1 is a block diagram for illustrating a schematic configuration of an anomalous tide level fluctuation sensing device according to this exemplary embodiment. In this figure, the anomalous tide level fluctuation sensing device comprises an image pickup unit 1, a data processor 2 configured to operate under program control, an alarm output unit 3, and a storage 4 configured to store information. The image pickup unit 1 is set at a position that allows a tide level fluctuation in a distance to be observed as vertical motion of a horizon, and includes a super-telephoto lens for allowing the tide level fluctuation in the distance to be observed as a difference predominant over jitter or shaking of an image within a video. Further, the alarm output unit 3 produces an image or sound for drawing attention when an anomalous tide level fluctuation is sensed.

Figure 2:
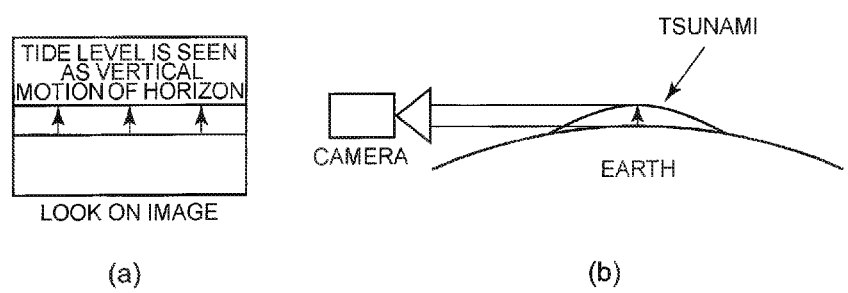
FIG. 2 shows diagrams for illustrating, on the assumption that the earth is a sphere, an example of an arrangement of an image pickup unit of the anomalous tide level fluctuation sensing device illustrated in FIG. 1 and an example of an image photographed by the image pickup unit.

The image pickup unit 1 used in the exemplary embodiment of this invention may employ, for example, a camera configured to photograph the video with 640 pixels in width by 480 pixels in height. It is assumed that such a super-telephoto lens is mounted to this camera as to be able to photograph, for example, an object having a height of 1 m at a distance of 30 kilometers ahead with approximately 6 pixels in height within a screen. At this time, this camera is arranged on a tangential line contacting a sea surface at the distance of 30 kilometers ahead of the camera assuming that the earth is a sphere as illustrated in FIG. 2(b). This arrangement allows, for example, the fluctuation of the tide level at the distance of 30 kilometers ahead to be observed as the vertical motion of the horizon within the screen as illustrated in FIG. 2(a).

The storage 4 comprises a histogram storage unit 41, a horizontal edge height storage unit 42, a normal-time maximum tide level storage unit 43, and a past tide level storage unit 44. The histogram storage unit 41 stores a past edge intensity histogram. The horizontal edge height storage unit 42 stores a past horizontal edge height and an unobserved time period. The normal-time maximum tide level storage unit 43 stores a normal-time maximum tide level that is a maximum height of the horizon that can be observed in a latest frame at the normal time when no anomalous tide level has occurred in the sea surface, The past tide level storage unit 44 stores a horizon height history and a time period history that are histories of information on the height of the horizon measured in the past and a time period taken to measure the height of the horizon.

The data processor 2 includes a horizon candidate detecting unit 21, a horizontal edge height tracking unit 22, and a tide height determination unit 23. Next, those units 21, 22, and 23 that constitute the data processor 2 will be described in detail.

Figure 3:
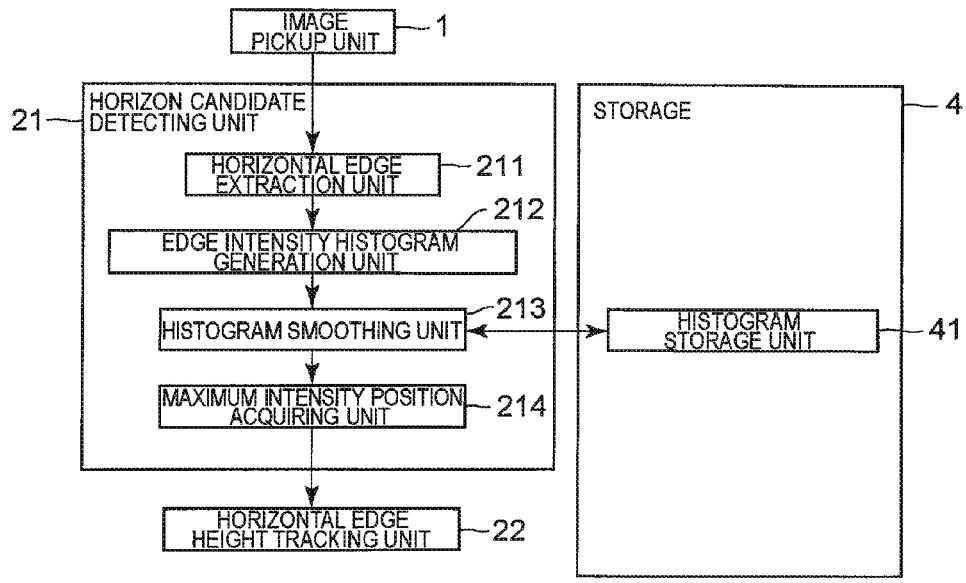
FIG. 3 is a block diagram for illustrating details of a horizon candidate detecting unit of the anomalous tide level fluctuation sensing device illustrated in FIG. 1.

FIG. 3 is a detailed block diagram of the horizon candidate detecting unit 21. In FIG. 3, the horizon candidate detecting unit 21 comprises a horizontal edge extraction unit 211, an edge intensity histogram generation unit 212, a histogram smoothing unit 213, and a maximum intensity position acquiring unit 214.

The horizontal edge extraction unit 211 carries out horizontal edge extraction by using only a filter for horizontal edge extraction among filters such as a Sobel filter and a Gabor filter for a latest-frame image exemplified in FIG. 4(a) within the video photographed by the image pickup unit 1. As a result, a current-frame horizontal edge intensity image exemplified in FIG. 4(b) is generated. When the horizon is visually recognized, a boundary portion corresponding to a portion in which a difference between a color of a sky and a color of the sea surface is exhibited is visually recognized as the horizon. Further, the boundary portion may be sensed by detecting a portion in which a gradation difference is exhibited vertically on the image, and this processing may be realized through use of horizontal edge detecting processing.

Figure 4:
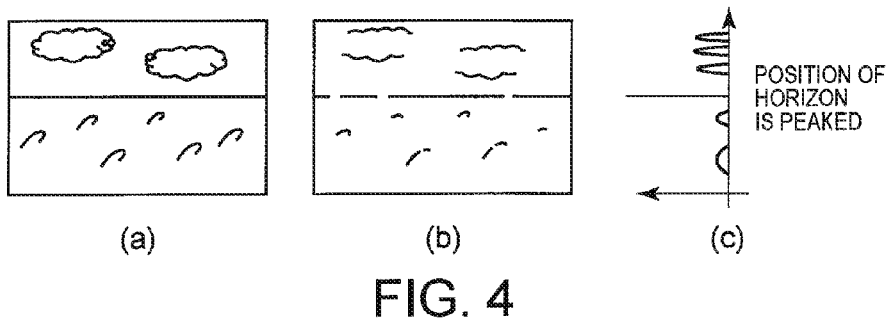
FIG. 4 shows diagrams for illustrating information obtained by the anomalous tide level fluctuation sensing device illustrated in FIG. 1, in which a horizon image is illustrated in (a), a horizontal edge image is illustrated in (b), and an edge intensity histogram is illustrated in (c)

The edge intensity histogram generation unit 212 obtains a total sum of horizontal edge intensities in a horizontal direction for each Y-coordinate from the current-frame horizontal edge intensity image extracted by the horizontal edge extraction unit 211, to generate a current-frame edge intensity histogram exemplified in FIG. 4(c). When the sea surface or the sky including the horizon is photographed, the horizon may be expected to be the laterally longest straight line within the image as illustrated in FIG. 4. Therefore, when the intensities of a horizontal edge extracted by the horizontal edge extraction unit 211 are summed up in a lateral direction to obtain an edge intensity histogram for each Y-coordinate, the position of the horizon may be expected to be a peak of the histogram.

The histogram smoothing unit 213 is supplied with the current-frame edge intensity histogram generated by the edge intensity histogram generation unit 212. When the past edge intensity histogram is not stored in the histogram storage unit 41, the current-frame edge intensity histogram is stored into the histogram storage unit 41 as the past edge intensity histogram. Then, the current-frame edge intensity histogram is provided to the subsequent processing means as a latest edge intensity histogram. When the past edge intensity histogram is stored in the histogram storage unit 41, the past edge intensity histogram is read. Then, the latest edge intensity histogram is calculated as a weighted sum between the past edge intensity histogram and the current-frame edge intensity histogram, and the latest edge intensity histogram is stored into the histogram storage unit 41 as the past edge intensity histogram, and provided to the subsequent processing means. Assuming that the position in the Y-coordinate having a maximum edge intensity independently for each frame is set as the height of the horizon, when there is a large ocean wave, a white cap or the like of the ocean wave appearing on a front side of the sea surface sometimes has a larger total sum of the horizontal edge intensities. However, the white cap does not stay in the same place for a long time period. Therefore, when the edge intensity histogram is smoothed temporally in the same manner as by the histogram smoothing unit 213, a probability that a position that keeps allowing the horizontal edge to be detected with stability for a long time period may be detected as the position of the horizon becomes higher.

The maximum intensity position acquiring unit 214 determines a bin of the histogram having a maximum intensity in the latest edge intensity histogram obtained by the histogram smoothing unit 213, and produces a value of the image corresponding to the bin in the Y-coordinate to the horizontal edge height tracking unit 22 as a latest horizon candidate coordinate.

The horizontal edge height tracking unit 22 receives the latest horizon candidate coordinate obtained by the maximum intensity position acquiring unit 214. When the past horizontal edge height is not stored in the horizontal edge height storage unit 42, the latest horizon candidate coordinate is produced to the tide height determination unit 23 as a horizon coordinate. When the past horizontal edge height is stored in the horizontal edge height storage unit 42, a difference between the latest horizon candidate coordinate and the past horizontal edge height is obtained. When the difference is equal to or smaller than a threshold value set so as to prevent a steep change, the latest horizon candidate coordinate is set as the horizon coordinate, and is produced to the tide height determination unit 23. Further, the horizon coordinate and the unobserved time period of 0 are respectively stored into the horizontal edge height storage unit 42. In a case where the difference between the latest horizon candidate coordinate and the past horizontal edge height is larger than the threshold value, when the unobserved time period stored in the horizontal edge height storage unit 42 is equal to or shorter than an unobserved time period threshold value set so as to approximately correspond to a passage time period of a vessel or the like, the past horizontal edge height is set as the horizon coordinate, and the horizon coordinate is produced to the tide height determination unit 23. Further, 1 is added to the unobserved time period, and a resultant thereof is stored into the horizontal edge height storage unit 42. When the unobserved time period is longer than the unobserved time period threshold value, the latest horizon candidate coordinate is set as the horizon coordinate, and the horizon coordinate is produced to the tide height determination unit 23. Further, the horizon coordinate and the unobserved time period of 0 are respectively stored into the horizontal edge height storage unit 42. On the sea surface to be observed, the vessel may traverse in front of the horizon. When the vessel having a long length, such as a tanker, passes, it is conceivable that the horizontal edge of a portion below which the vessel is under water has a higher intensity than the horizon. Therefore, in order to reduce the probability of misdetection of a water immersion position of the vessel, when a great amount of movement of the horizontal edge is observed during a shorter time period than a time period during which the vessel traverses within the screen under the environment in which an observation is conducted, this movement is inhibited from being recognized as the horizon, and a horizon position that has been observed so far is kept tracking. As a result, the horizon may be detected with more accuracy.

Figure 5:
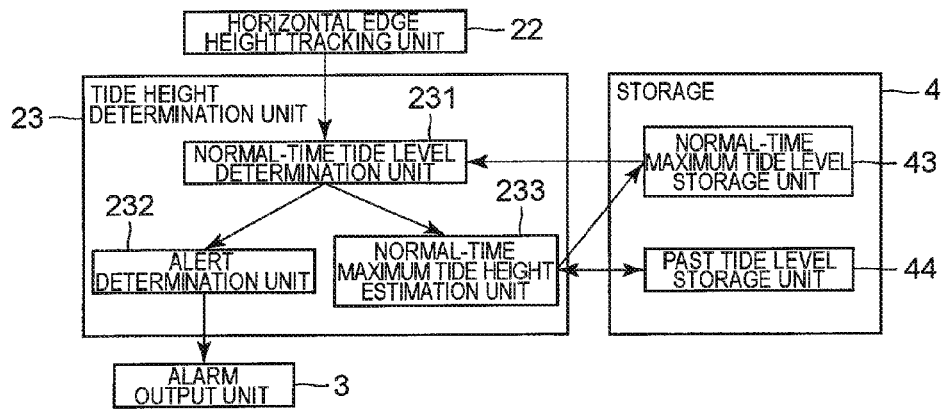
FIG. 5 is a block diagram for illustrating details of a tide height determination unit of the anomalous tide level fluctuation sensing device illustrated in FIG. 1.

FIG. 5 is a detailed block diagram of the tide height determination unit 23. In FIG. 5, the tide height determination unit 23 comprises a normal-time tide level determination unit 231, an alert determination unit 232, and a normal-time maximum tide height estimation unit 233.

The normal-time tide level determination unit 231 determines whether or not the horizon coordinate obtained from the horizontal edge height tracking unit 22 is above the normal-time maximum tide level stored in the normal-time maximum tide level storage unit 43 on the image, and determines presence or absence of an occurrence of an anomalous tide level fluctuation.

In a case where the normal-time tide level determination unit 231 determines that the anomalous tide level fluctuation has occurred, when it keeps being determined that the anomalous tide level fluctuation has occurred for a period equal to or longer than M seconds (M≥0), the alert determination unit 232 instructs the alarm output unit 3 to produce caution information indicating that the anomalous tide level fluctuation has occurred. In this case, assuming that M is set to an appropriate value other than zero, there is no degradation in sensing accuracy in a case where the anomalous tide level fluctuation occurs during a fixed time period during which a tsunami or the like occurs (case where a state in which the tide level is anomalously high continues for M seconds). Even when the horizon position that exceeds the threshold value is detected instantaneously due to erroneous identification of the horizon position, the alarm is inhibited from occurring unless the same horizon is detected in the same place with stability, which improves a false report rate.

Figure 6:
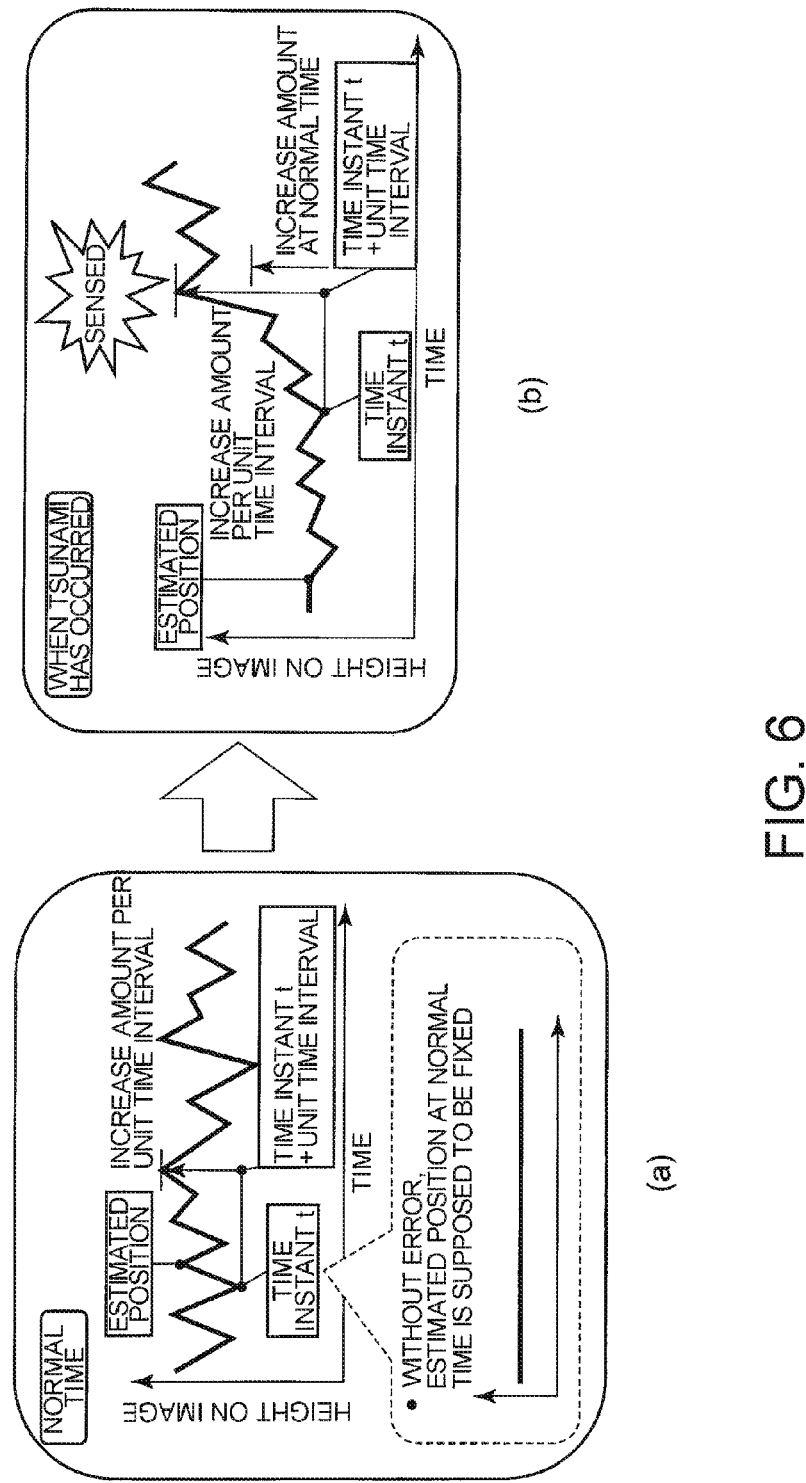
FIG. 6 shows diagrams in which an example of how a normal-time maximum tide level is obtained by a normal-time maximum tide height estimation unit of the anomalous tide level fluctuation sensing device illustrated in FIG. 1 is illustrated in (a) and (b)

The normal-time maximum tide height estimation unit 233 predicts the normal-time maximum tide level to be exhibited N seconds after a present time based on the tide level determined by the normal-time tide level determination unit 231 and the horizon height history and the time period history that are stored in the past tide level storage unit 44. Further, the forecast normal-time maximum tide level to be exhibited N seconds after the present time is stored in the normal-time maximum tide level storage unit 43. In this case, an example of how to obtain the normal-time maximum tide level is illustrated in FIG. 6. Even at the normal time when no anomalous tide level fluctuation occurs, a positional fluctuation of the horizon occurs by several pixels due to a difference in look of the sea surface depending on the ocean wave, a tide, a weather variation, or a sunshine variation, an error caused by image analysis processing itself, or the like (see FIG. 6(a)). At this time, the anomalous tide level fluctuations of for example, the ocean wave, the tide, and the tsunami are different from one another in units of a change cycle as seconds, hours, and minutes, respectively. Therefore, in order to sense the anomalous tide level fluctuation of the tsunami, the observation of fluctuations in the tide level in units of minutes to units of 10 minutes allows an observation dedicated to the anomalous tide level fluctuation of the tsunami without being influenced by the ocean wave or the tide. However, even in this case, the variation in the weather or the sunshine or the error caused by the image analysis itself occurs. Therefore, the alert may be issued only when an estimation result of the tide level becomes as large as equal to or larger than the variation in the weather or the sunshine or the error caused by the image analysis itself that occurs in units of minutes to units of 10 minutes as illustrated in FIG. 6(b). For example, in a case where an estimation error that occurs for 10 minutes at the normal time is 6 pixels, when the horizon coordinate obtained from the horizontal edge height tracking unit 22 is higher than a position higher by 6 pixels than a minimum tide level during a period since 10 minutes before a time at which normal-time tide level determination is to be conducted, such a measure may be taken as to, for example, issue the alarm by determining that the anomalous tide level fluctuation has occurred.

Figure 7:
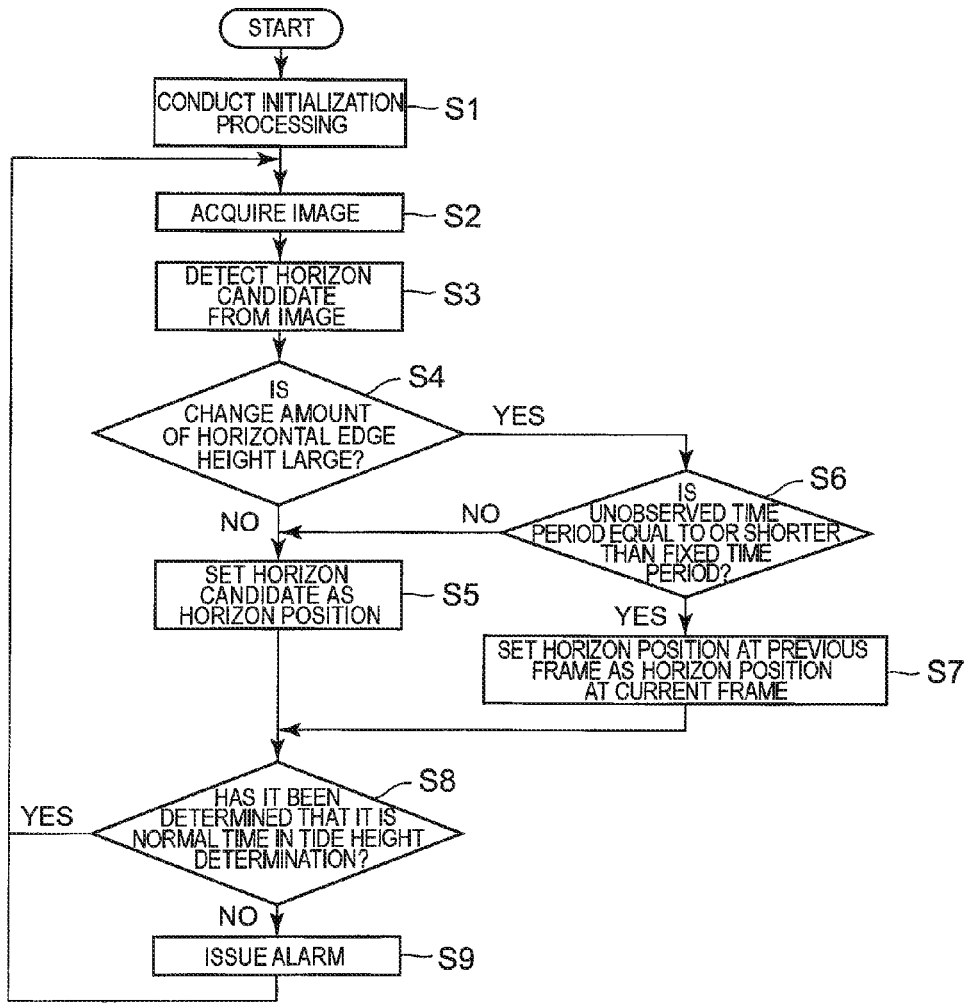
FIG. 7 is a flowchart for illustrating an operation of the anomalous tide level fluctuation sensing device according to the first exemplary embodiment of this invention.
Figure 8:
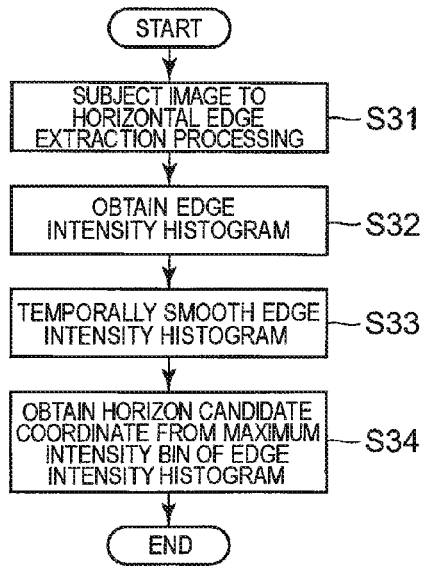
FIG. 8 is a flowchart for illustrating an operation of the horizon candidate detecting unit of the anomalous tide level fluctuation sensing device illustrated in FIG. 1.
Figure 9:
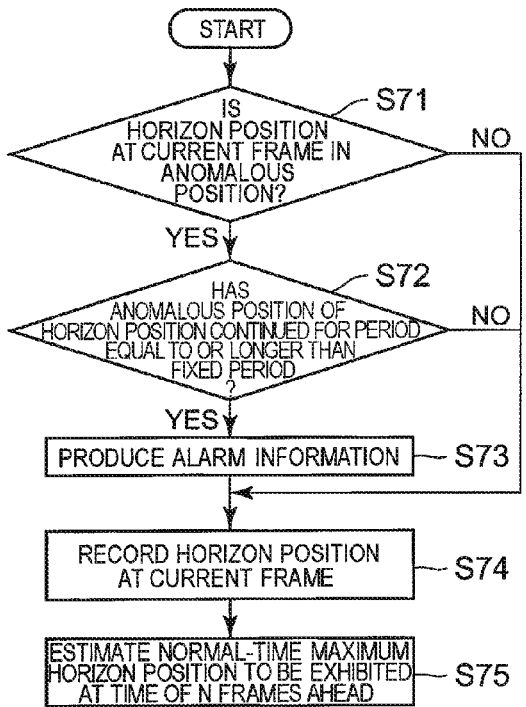
FIG. 9 is a flowchart for illustrating an operation of the tide height determination unit of the anomalous tide level fluctuation sensing device illustrated in FIG. 1.

FIG. 7 is a flowchart for illustrating an operation of the anomalous tide level fluctuation sensing device according to the exemplary embodiment of this invention, FIG. 8 is a flowchart of the horizon candidate detecting unit 21 illustrated in FIG. 1, and FIG. 9 is a flowchart of the tide height determination unit 23 illustrated in FIG. 1. The operation of the anomalous tide level fluctuation sensing device and the anomalous tide level fluctuation sensing method according to the exemplary embodiment of this invention will be described with reference to FIG. 1, FIG. 3, FIG. 5, and FIG. 7 to FIG. 9.

When processing for the anomalous tide level fluctuation sensing device is started, the storage 4, a variable, and the like are first initialized (Step S1 in FIG. 7). Subsequently, the anomalous tide level fluctuation sensing device acquires a latest-frame image from the image pickup unit (1 in FIG. 1) (Step S2 in FIG. 7), and the horizon candidate detecting unit (21 in FIG. 1) detects a horizon candidate based on horizontal edge information within the image (Step S3 in FIG. 7). The horizontal edge height tracking unit (22 in FIG. 1) compares the detected horizon candidate with a past edge height stored in the horizontal edge height storage unit (42 in FIG. 1) (Step S4 in FIG. 7). When a change amount is small, the horizon candidate is set as the horizon position (Step S5 in FIG. 7), and when the change amount is large, it is determined whether or not the unobserved time period stored in the horizontal edge height storage unit (42 in FIG. 1) is equal to or shorter than the fixed time period (Step S6 in FIG. 7). When the unobserved time period is longer than the fixed time period, the horizon candidate is set as the horizon position (Step S5 in FIG. 7), and when the unobserved time period is equal to or shorter than the fixed time period, the horizon position at a previous frame is set as the horizon position at a current frame (Step S7 in FIG. 7). Subsequently, the tide height determination unit (23 in FIG. 1) determines whether or not the horizon position exceeds the maximum height of the horizon at the normal time predicted from observation results collected so far (Step S8 in FIG. 7). When the horizon position does not exceed the maximum height, the subsequent frame image is acquired (Step S2 in FIG. 7), and when the horizon position exceeds the maximum height, the alarm output unit (3 in FIG. 1) is caused to issue the alarm for notifying that the anomalous tide level has occurred (Step S9 in FIG. 7), and the subsequent frame image is acquired (Step S2 in FIG. 7).

The horizon candidate detecting unit (21 in FIG. 1) conducts processing illustrated in the flowchart of FIG. 8. When the image is supplied, the horizontal edge extraction unit (211 in FIG. 3) carries out the horizontal edge extraction, and produces a horizontal edge intensity image (Step S31 in FIG. 8). The edge intensity histogram creation unit (212 in FIG. 3) calculates the total sum of edge intensities in the horizontal direction for each Y-coordinate from the obtained horizontal edge intensity image, to obtain the current-frame edge intensity histogram (S32 in FIG. 8). The histogram smoothing unit (213 in FIG. 3) calculates the weighted sum between the past edge intensity histogram and the current-frame edge intensity histogram that are stored in the histogram storage unit (41 in FIG. 3). Further, the histogram smoothing unit calculates the latest edge intensity histogram smoothed temporally, and stores the latest edge intensity histogram in the histogram storage unit 41 as the past edge intensity histogram (Step S33 in FIG. 8). The maximum intensity position acquiring unit (214 in FIG. 3) produces the Y-coordinate corresponding to the bin of the histogram indicating the maximum intensity of the latest edge intensity histogram as the horizon candidate coordinate (Step S34 in FIG. 8).

The tide height determination unit (23 in FIG. 1) conducts processing illustrated in the flowchart of FIG. 9. When the horizon coordinate is obtained by the horizontal edge height tracking unit (22 in FIG. 1), the normal-time tide level determination unit (231 in FIG. 5) compares the horizon coordinate with the normal-time maximum tide level stored in the normal-time maximum tide level storage unit (43 in FIG. 5), and determines whether or not the horizon position at the current frame is in an anomalous position (Step S71 in FIG. 9). When it is determined that the horizon position is in the anomalous position, the alert determination unit (232 in FIG. 5) determines whether or not a state of being in the anomalous position has continued for a period equal to or longer than M frames (M≥0) (Step 72 in FIG. 9). When the anomalous position has continued, it is determined that the anomalous tide level change has occurred, and the alarm output unit (3 in FIG. 1) is caused to notify that the anomalous tide level change has occurred. The normal-time maximum tide height estimation unit (233 in FIG. 5) predicts the normal-time maximum tide level to be exhibited at a time N, which is a fixed time period after the present time, based on the tide level determined by the normal-time tide level determination unit (231 in FIG. 5) and the horizon height history and the time period history that are stored in the past tide level storage unit (44 in FIG. 5). Then, the normal-time maximum tide height estimation unit stores the normal-time maximum tide level to be exhibited at the time N into the normal-time maximum tide level storage unit (43 in FIG. 5), and stores the horizon position at the current frame into the past tide level storage unit (44 in FIG. 5).

The anomalous tide level fluctuation sensing device according to the first exemplary embodiment of this invention uses a camera to photograph the tide level fluctuation in a place distant from a coast, to estimate the anomalous tide level fluctuation without exception, which allows a first wave and subsequent waves of a tsunami to be sensed even when a plurality of tsunamis arrive at a coastal area in succession.

Second Exemplary Embodiment

Subsequently, a second exemplary embodiment of this invention will be described. The second exemplary embodiment of this invention is a modified example of the above-mentioned first exemplary embodiment. In the following, in this exemplary embodiment, parts having functions similar to the parts that have been already described in the first exemplary embodiment are denoted by the same reference symbols, and a description thereof is omitted.

Figure 10:
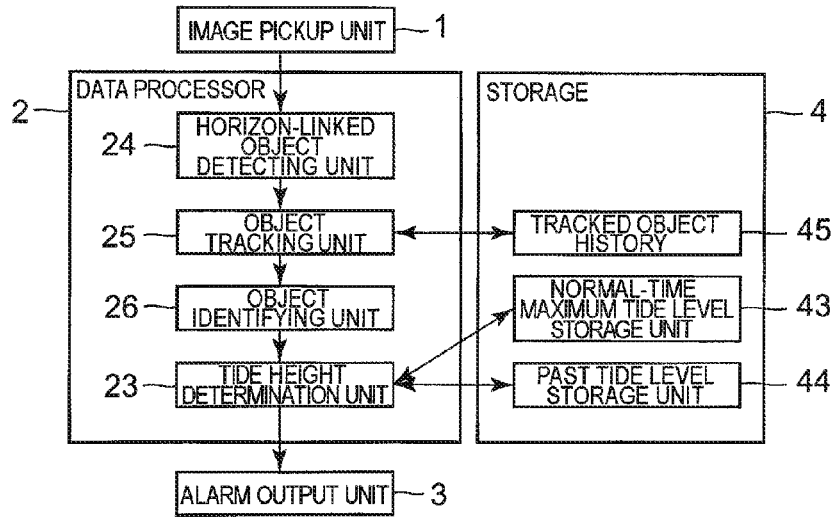
FIG. 10 is a block diagram for illustrating a configuration of an anomalous tide level fluctuation sensing device according to a second exemplary embodiment of this invention.

FIG. 10 is a block diagram for illustrating a schematic configuration of an anomalous tide level fluctuation sensing device according to the second exemplary embodiment of this invention. In FIG. 10, the anomalous tide level fluctuation sensing device according to this exemplary embodiment has the same apparatus configuration as that of the first exemplary embodiment, except that blocks including the data processor 2 and the storage 4 are different. The image pickup unit 1 and the alarm output unit 3 are the same as those of the first exemplary embodiment, and hence only different points are described below.

The storage 4 is different from that of the first exemplary embodiment in that the histogram storage unit 41 and the horizontal edge height storage unit 42 are replaced by a tracked object history 45. The tracked object history 45 stores object tracking information obtained by an object tracking unit 25 described later.

The data processor 2 is different from that of the first exemplary embodiment in that the horizon candidate detecting unit 21 and the horizontal edge height tracking unit 22 are replaced by a horizon-linked object detecting unit 24, the object tracking unit 25, and an object identifying unit 26.

Figure 11:
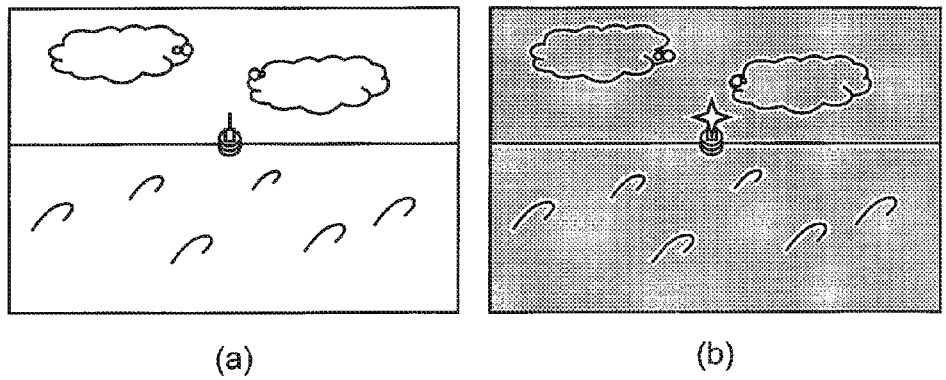
FIG. 11 shows diagrams for illustrating information obtained by the anomalous tide level fluctuation sensing device illustrated in FIG. 10, in which an image of a horizon and a GPS ocean wave meter is illustrated in (a) and an image of the horizon at nighttime and a light of the GPS ocean wave meter is illustrated in (b)

The horizon-linked object detecting unit 24 detects a horizon-linked object expected to exhibit the vertical motion in association with the vertical motion of the horizon within the image, and produces a position of the horizon-linked object. Conceivable examples of the horizon-linked object include a global positioning system (GPS) ocean wave meter and a buoy moored in an offing as illustrated in FIG. 11(a). The GPS ocean wave meter or the buoy is floating on the sea, and may be expected to exhibit the vertical motion in association with the horizon exhibiting the vertical motion due to the influence of the tide level fluctuation within the video photographed by the image pickup unit 1. Further, through mounting of a light to those horizon-linked objects as illustrated in FIG. 11(b), the height of the horizon may be estimated by detecting the position of the light even at nighttime when visual recognition of the horizon is inhibited. In this case, the change of the anomalous tide level may be sensed based on the height of the horizon night and day.

Figure 12:
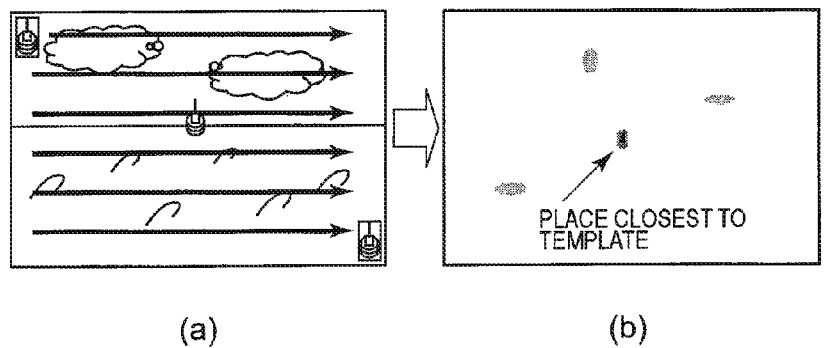
FIG. 12 shows diagrams for illustrating information obtained by the anomalous tide level fluctuation sensing device illustrated in FIG. 10, in which an example of processing for detecting the GPS ocean wave meter based on template matching is illustrated in (a) and (b)

Template matching or the like may be used for detection of the GPS ocean wave meter or the buoy. The template matching is a method of comprehensively searching the image to be processed for a place similar to a template image indicating a pattern of a detection target as illustrated in FIG. 12(a), to assume that the detection target exists in a position exhibiting a pattern similar to the template image as illustrated in FIG. 12(b). At this time, the template image to be used may be formed of a single image or a plurality of images of the detection target, or matching may be conducted by using feature amount data obtained by converting the image into a feature that allows identification between the detection target and another object to be conducted more easily than in a case where the matching is conducted with the image itself. For example, in the case of using the image itself, when the image changes in brightness, there occurs a great difference in brightness between the template image and the detection target, but when only contour information on an object called "edge image" is used, the matching is less likely to be influenced by the brightness of the image, which allows the object detection to be conducted with higher accuracy.

Figure 13:
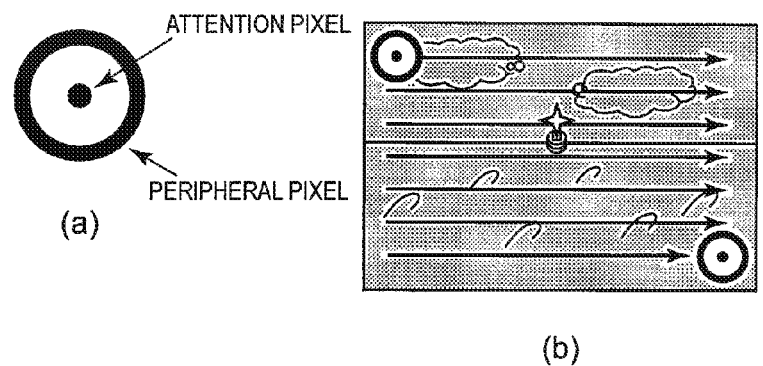
FIG. 13 shows diagrams in which an example of a ring filter is illustrated in (a) and an example of applying the ring filter to the image is illustrated in (b)

The template matching or the bright spot detection filter called "ring filter" may be used for the detection of the position of the light. The ring filter is filter processing for examining the gradation difference between such an attention pixel and its peripheral pixel as illustrated in FIG. 13(a), to set the attention pixel as a bright spot when a gradation value of the attention pixel is higher (brighter) than a gradation value of the peripheral pixel by a value equal to or larger than a fixed value. As illustrated in FIG. 13(b), comprehensive application of this ring filter to the entire screen allows a candidate for the bright spot within the screen to be obtained.

Figure 14:
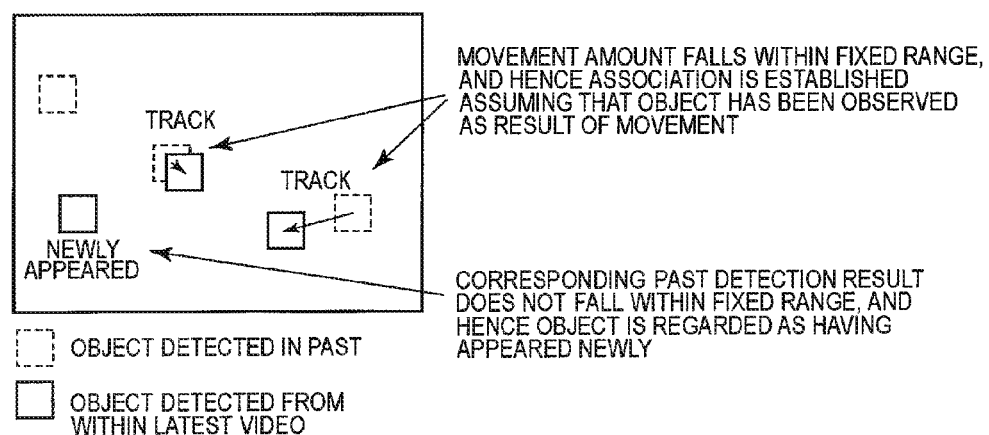
FIG. 14 is a diagram for illustrating an example of object tracking conducted by an object tracking unit of the anomalous tide level fluctuation sensing device illustrated in FIG. 10.

The object tracking unit 25 conducts object tracking by associating the object detected in the past with the object detected from within a latest video, and stores an object tracking result in the tracked object history 45, to produce the object tracking result. Examples of a method for association of the objects being often used include a method of associating the objects, which have such a relationship that a distance between the position of the object detected in the past and the position of the object detected from within the latest video falls within a fixed range, with each other as illustrated in FIG. 14. There are various tracking technologies such as a Kalman filter for estimating which position in a current video a past detection result has moved, a particle filter, a mean shift for adjusting the position of the tracking target by apparent closeness thereof, and the template matching, but any of the methods may be employed in the second exemplary embodiment of this invention. Further, in a case where the light is turned on, by holding a past tracking result that failed to be associated with the object within the latest video for a period equal to or longer than a period during which the light is turned off, the association may be established when the light is turned on again, which also allows the tracking of the lighted object and the prediction of the position of the object at a light-off time.

The object identifying unit 26 identifies the best candidate object closer to the detection target from among the object tracking results obtained by the object tracking unit 25 based on a motion pattern, a look thereof, and the like, and produces the position of the best candidate object. The object detected by the horizon-linked object detecting unit 24 may involve such misdetection as to detect an object different from the detection target. For example, in the case of using the ring filter, the vessel on a passage through an observation region, noise within the video, and the like are erroneously detected in addition to the light mounted to the detection target. The vessel moves within the video, and the noise is intermittently observed in an irregular manner. In contrast, the light of the detection target stays in the same place to be observed for a long time period. Therefore, the misdetection of the object is suppressed by setting the object tracking result having such a motion pattern as to stay in the same place for a longer time period as the best candidate object, which increases the probability that the correct position of the detection target is obtained. Further, a similarity between the look of the best candidate object detected in the past and the look of an object tracking candidate may be evaluated to determine the best candidate object. Further, it may be expected that a further increase in accuracy is enabled by selection of the best candidate object through use of both the motion pattern and the look of the object.

The tide height determination unit 23 conducts the same processing as the tide height determination unit (23 in FIG. 1) according to the first exemplary embodiment of this invention, but an input thereof is positional information on the best candidate object obtained by the object identifying unit 26. As a result, the anomalous tide level fluctuation may be estimated by using the vertical motion of the object exhibited in association with the vertical motion of the horizon detected from within the video.

Figure 15:
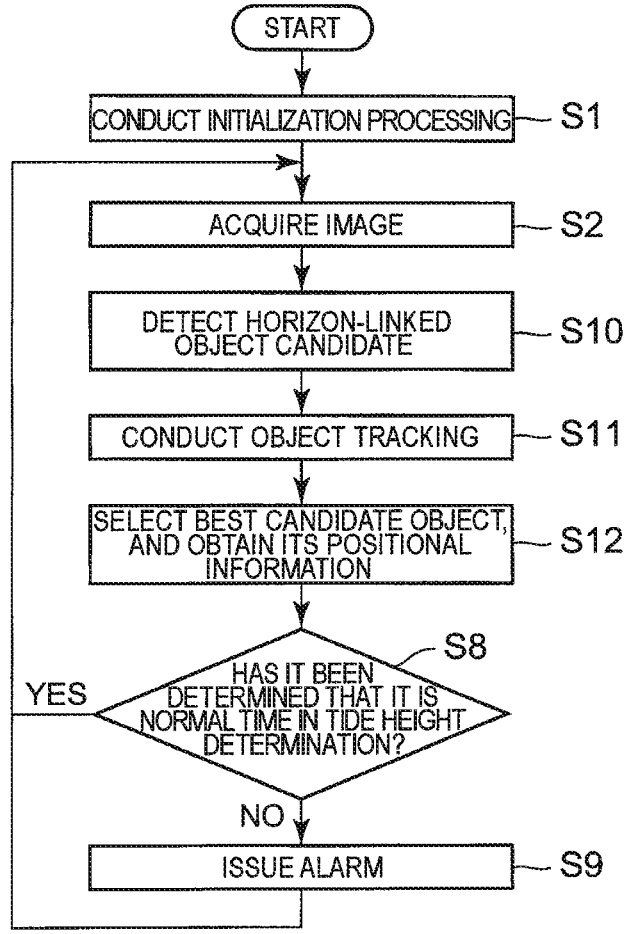
FIG. 15 is a flowchart for illustrating an operation of the anomalous tide level fluctuation sensing device according to the second exemplary embodiment of this invention.

FIG. 15 is a flowchart for illustrating an operation of the anomalous tide level fluctuation sensing device according to the second exemplary embodiment of the this invention, which is different from the flowchart of the first exemplary embodiment of this invention illustrated in FIG. 7 in that Step S3 to Step S7 are replaced by Step S10 to Step S12. Only parts different from the flowchart of the first exemplary embodiment will be described below.

In the second exemplary embodiment of this invention, the horizon-linked object detecting unit (24 in FIG. 10) detects the object exhibiting the same motion as the vertical motion of the horizon from the video acquired in Step 2 (Step S10). The detected object is associated with the past detection result by the object tracking unit (25 in FIG. 10), to acquire the object tracking result (Step S11). Based on the motion pattern, the look, and the like of the obtained object tracking result, the object identifying unit (26 in FIG. 10) selects a candidate that appears more like the detection target as the best candidate object, and produces the positional information on the object (Step S12). Based on the positional information on the best candidate object, the tide height determination unit (23 in FIG. 10) carries out processing for sensing the anomalous tide level fluctuation in the same manner as in the processing flow (FIG. 9) of the tide height determination unit according to the first exemplary embodiment of this invention (Step S8).

The anomalous tide level fluctuation sensing device according to the second exemplary embodiment of this invention uses the camera to photograph the object exhibiting the vertical motion in association with the tide level fluctuation and detect the motion of the object, to estimate the anomalous tide level fluctuation without exception, which allows the first wave and the subsequent waves of the tsunami to be sensed even when the plurality of tsunamis arrive at the coastal area in succession.

Third Exemplary Embodiment

Subsequently, a third exemplary embodiment of this invention is described. The third exemplary embodiment of this invention is a modified example of the above-mentioned first and second exemplary embodiments. In the following, in this exemplary embodiment, parts having functions similar to the parts that have been already described in the first and second exemplary embodiments are denoted by the same reference symbols, and a description thereof is omitted.

The third exemplary embodiment of this invention provides an anomalous tide level fluctuation sensing device that uses detection of the horizon and detection of the horizon-linked object in combination. The tide height determination unit selects information based on AND determination, OR determination, or time information of both a detection unit for the horizon and a detection unit for the horizon-linked object. In a case of using the time information, for example, a time of a data processor at which the video is acquired is compared with a sunrise time and a sunset time, and tide height determination is conducted by using the position of the horizon when the time falls between the sunrise time and the sunset time, and using the position of the horizon-linked object when the time falls between the sunset time and the sunrise time.

The anomalous tide level fluctuation sensing device according to the third exemplary embodiment of this invention uses the camera to photograph the horizon or the object that exhibits the vertical motion in association with the tide level fluctuation and detect the motion of the horizon or the object, to estimate the anomalous tide level fluctuation based on results of the motion of both thereof without exception, which allows the first wave and the subsequent waves of the tsunami to be sensed irrespective of an observation time even when the plurality of tsunamis arrive at the coastal area in succession.

An anomalous tide level fluctuation sensing method using a feature included in each of the exemplary embodiments described above is also included in the scope of this invention.

Note that, the anomalous tide level fluctuation sensing method described above can be stored as a program that is executable by a computer on a recording medium such as a magnetic disk, such as a floppy (trademark) disk or a hard disk, an optical disc, such as a CD-ROM or a DVD, a magneto-optic disk (MO), or a semiconductor memory, and can be distributed. Further, as long as the recording medium can store a program, and can be read by a computer, a storage form may be any form.

Further, an operating system, middleware such as database management software, and network software, or the like operating on a computer may carry out a part of the respective pieces of the processing based on instructions of a program installed from the recording medium on the computer. Further, the above-mentioned recording medium is not limited to a medium independent of the computer, and includes a recoding medium for storing or temporarily storing a downloaded program transmitted via a LAN, the Internet, or the like.

Further, the number of the recording media is not limited to one. When the processing described in the above-mentioned exemplary embodiments is carried out from a plurality of media, the plurality of media are also included in the recording medium according to this invention, and a medium configuration may be any configuration. The computer carries out the respective pieces of processing based on programs stored in a recording medium, and may have any configuration such as an apparatus constructed by a personal computer, a system in which a plurality of apparatus are connected via a network, or the like. Further, the computer is not limited to a personal computer. The computer includes an arithmetic processing device included in an information processing apparatus, and is a device or apparatus capable of implementing the functions of this invention by using a program.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

Further, the specific configuration according to this invention is not limited to the exemplary embodiments described above, and this invention encompasses changes made without departing from the gist of this invention, such as separation or merging of block configurations, permutation of steps, and combining of the respective exemplary embodiments.

This application is based upon and claims the benefit of priority from Japanese Patent Application No. 2013-200075, filed on Sep. 26, 2013, the disclosure of which is incorporated herein in its entirety by reference.

Further, the whole or part of the above-mentioned exemplary embodiments can be described as, but not limited to, the following supplementary notes.

[Supplementary Note 1]
An anomalous tide level fluctuation sensing device, which is configured to:
detect a position of an object or a horizon, which changes in association with a tide level, from within a video; and
detect that the position fluctuates in a time cycle different from a time cycle of a tide or an ocean wave.

[Supplementary Note 2]
An anomalous tide level fluctuation sensing device, which is configured to:
detect a position of an object and a position of a horizon, which fluctuate in association with a tide level, from within a video; and
detect that any one of the position of the object and the position of the horizon fluctuates in a time cycle different from a time cycle of a tide or an ocean wave.

[Supplementary Note 3]
An anomalous tide level fluctuation sensing device, which is configured to:
detect a position of an object and a position of a horizon, which fluctuate in association with a tide level, from within a video; and
detect that any one of the position of the object and the position of the horizon fluctuates in a time cycle different from a time cycle of a tide or an ocean wave based on a time by using any one of the fluctuation of the position of the object and the fluctuation of the position of the horizon.

[Supplementary Note 4]
An anomalous tide level fluctuation sensing device according to any one of Supplementary Notes 1 to 3, in which the anomalous tide level fluctuation sensing device is further configured to detect a tide level fluctuation having a range of from several minutes to several tens of minutes as the time cycle different from the time cycle of the tide or the ocean wave.

[Supplementary Note 5]
An anomalous tide level fluctuation sensing device, including:
a horizon candidate detecting unit configured to detect a horizon candidate based on horizontal edge information within a frame image;
a horizontal edge height tracking unit configured to compare the detected horizon candidate with a past edge height stored in a storage to acquire a horizon coordinate; and
a tide height determination unit configured to determine whether or not the horizon coordinate exceeds a maximum height of a horizon at a normal time, which is forecast from an observation result.

[Supplementary Note 6]
An anomalous tide level fluctuation sensing device according to Supplementary Note 5, in which the horizon candidate detecting unit includes:
a horizontal edge extraction unit configured to carry out horizontal edge extraction by using a filter for the frame image to generate a current-frame horizontal edge intensity image;
an edge intensity histogram generation unit configured to create a current-frame edge intensity histogram from the created current-frame horizontal edge intensity image;
a histogram smoothing unit configured to generate a latest edge intensity histogram by temporally smoothing the created current-frame edge intensity histogram with reference to the storage; and
a maximum intensity position acquiring unit configured to determine a bin of a histogram having a maximum intensity in the latest edge intensity histogram to produce a latest horizon candidate coordinate.

[Supplementary Note 7]

An anomalous tide level fluctuation sensing device according to Supplementary Note 6, in which the horizontal edge height tracking unit is further configured to: receive the latest horizon candidate coordinate; refer to the storage; produce the latest horizon candidate coordinate as the horizon coordinate when a past horizontal edge height is not stored in the storage; obtain a difference between the latest horizon candidate coordinate and the past horizontal edge height when the past horizontal edge height is stored in the storage; and produce the latest horizon candidate coordinate as the horizon coordinate when the difference is equal to or smaller than a threshold value set so as to prevent a steep fluctuation.

[Supplementary Note 8]

An anomalous tide level fluctuation sensing device according to any one of Supplementary Notes 5 to 7, in which the tide height determination unit includes:

a normal-time tide level determination unit configured to determine whether or not the acquired horizon coordinate is above a normal-time maximum tide level stored in the storage on an image, and determine presence or absence of an occurrence of an anomalous tide level fluctuation;

an alert determination unit configured to issue an instruction to produce caution information indicating that the anomalous tide level fluctuation has occurred when it is determined that the anomalous tide level fluctuation has occurred; and a normal-time maximum tide height estimation unit configured to predict the normal-time maximum tide level to be exhibited N seconds after a present time based on a determined tide level and based on a horizon height history and a time period history that are stored in the storage, and store the normal-time maximum tide level to be exhibited N seconds after the present time.

[Supplementary Note 9]

An anomalous tide level fluctuation sensing device, including:

a horizon-linked object detecting unit configured to detect a horizon-linked object expected to exhibit vertical motion in association with vertical motion of a horizon within a video to produce a position of the horizon-linked object;

an object tracking unit configured to conduct object tracking by associating an object detected in a past with an object detected from within the video to produce object tracking results; and an object identifying unit configured to identify a best candidate object closer to a detection target from among the object tracking results to produce a position of the best candidate object.

[Supplementary Note 10]

An anomalous tide level fluctuation sensing device, which is configured to use the detecting of the horizon of Supplementary Note 5 and the detecting of the horizon-linked object of Supplementary Note 9 in combination, wherein the anomalous tide level fluctuation sensing device is further configured to:

detect motion of a horizon or an object exhibiting vertical motion in association with a tide level fluctuation; and sense an anomalous tide level fluctuation based on a result of the motion of both or one of the horizon and the object.

[Supplementary Note 11]

An anomalous tide level fluctuation sensing method, including:

detecting a position of an object or a horizon, which fluctuates in association with a tide level, from within a video; and detecting that the position fluctuates in a time cycle different from a time cycle of a tide or an ocean wave.

[Supplementary Note 12]

An anomalous tide level fluctuation sensing method, including:

detecting a position of an object and a position of a horizon, which fluctuate in association with a tide level, from within a video; and detecting that any one of the position of the object and the position of the horizon fluctuates in a time cycle different from a time cycle of a tide or an ocean wave.

[Supplementary Note 13]

An anomalous tide level fluctuation sensing method, including:

detecting a position of an object and a position of a horizon, which fluctuate in association with a tide level, from within a video; and detecting that any one of the position of the object and the position of the horizon fluctuates in a time cycle different from a time cycle of a tide or an ocean wave based on a time by using any one of the fluctuation of the position of the object and the fluctuation of the position of the horizon.

[Supplementary Note 14]

An anomalous tide level fluctuation sensing method according to any one of Supplementary Notes 11 to 13, further including detecting a tide level fluctuation having a range of from several minutes to several tens of minutes as the time cycle different from the time cycle of the tide or the ocean wave.

[Supplementary Note 15]

An anomalous tide level fluctuation sensing method, including:

detecting a horizon candidate based on horizontal edge information within a frame image;

comparing the detected horizon candidate with a past edge height stored in a storage to acquire a horizon coordinate; and determining whether or not the horizon coordinate exceeds a maximum height of a horizon at a normal time, which is forecast from an observation result.

[Supplementary Note 16]

An anomalous tide level fluctuation sensing method according to Supplementary Note 15, further including:

carrying out horizontal edge extraction by using a filter for the frame image to generate a current-frame horizontal edge intensity image;

generating a current-frame edge intensity histogram from the generated current-frame horizontal edge intensity image;

generating a latest edge intensity histogram by temporally smoothing the generated current-frame edge intensity histogram with reference to the storage; and determining a bin of a histogram having a maximum intensity in the latest edge intensity histogram to produce a latest horizon candidate coordinate.

[Supplementary Note 17]

An anomalous tide level fluctuation sensing method according to Supplementary Note 16, further including: receiving the latest horizon candidate coordinate; referring to the storage; producing the latest horizon candidate coordinate as the horizon coordinate when a past horizontal edge height is not stored in the storage; obtaining a difference between the latest horizon candidate coordinate and the past horizontal edge height when the past horizontal edge height is stored in the storage; and producing the latest horizon candidate coordinate as the horizon coordinate when the difference is equal to or smaller than a threshold value set so as to prevent a steep fluctuation.

[Supplementary Note 18]

An anomalous tide level fluctuation sensing method according to any one of Supplementary Notes 15 to 17, further including:

determining whether or not the acquired horizon coordinate is above a normal-time maximum tide level stored in the storage on an image, and determining presence or absence of an occurrence of an anomalous tide level fluctuation;

issuing an instruction to produce caution information indicating that the anomalous tide level fluctuation has occurred when it is determined that the anomalous tide level fluctuation has occurred; and predicting the normal-time maximum tide level to be exhibited N seconds after a present time based on a determined tide level and based on a horizon height history and a time period history that are stored in the storage, and storing the normal-time maximum tide level to be exhibited N seconds after the present time.

[Supplementary Note 19]

An anomalous tide level fluctuation sensing method, including:

detecting a horizon-linked object expected to exhibit vertical motion in association with vertical motion of a horizon within a video to produce a position of the horizon-linked object;

conducting object tracking by associating an object detected in a past with an object detected from within the video to produce object tracking results; and identifying a best candidate object closer to a detection target from among the object tracking results to produce a position of the best candidate object.

[Supplementary Note 20]

An anomalous tide level fluctuation sensing method for using the detecting of the horizon of Supplementary Note 15 and the detecting of the horizon-linked object of Supplementary Note 19 in combination, wherein the anomalous tide level fluctuation sensing method includes:

detecting motion of a horizon or an object exhibiting vertical motion in association with a tide level fluctuation; and sensing an anomalous tide level fluctuation based on a result of the motion of both or one of the horizon and the object.

[Supplementary Note 21]

An anomalous tide level fluctuation sensing program for causing a computer to implement the functions of:

detecting a position of an object or a horizon, which fluctuates in association with a tide level, from within a video; and detecting that the position fluctuates in a time cycle different from a time cycle of a tide or an ocean wave.

[Supplementary Note 22]

An anomalous tide level fluctuation sensing program for causing a computer to implement the functions of:

detecting a position of an object and a position of a horizon, which fluctuate in association with a tide level, from within a video; and detecting that any one of the position of the object and the position of the horizon fluctuates in a time cycle different from a time cycle of a tide or an ocean wave.

[Supplementary Note 23]

An anomalous tide level fluctuation sensing program for causing a computer to implement the functions of:

detecting a position of an object and a position of a horizon, which fluctuate in association with a tide level, from within a video; and detecting that any one of the position of the object and the position of the horizon fluctuates in a time cycle different from a time cycle of a tide or an ocean wave based on a time by using any one of the fluctuation of the position of the object and the fluctuation of the position of the horizon.

[Supplementary Note 24]

An anomalous tide level fluctuation sensing program according to any one of Supplementary Notes 21 to 23, in which the anomalous tide level fluctuation sensing program further causes the computer to implement a function of detecting a tide level fluctuation having a range of from several minutes to several tens of minutes as the time cycle different from the time cycle of the tide or the ocean wave.

[Supplementary Note 25]

An anomalous tide level fluctuation sensing program for causing a computer to implement:

a horizon candidate detecting function of detecting a horizon candidate based on horizontal edge information within a frame image;

a horizontal edge height tracking function of comparing the detected horizon candidate with a past edge height stored in a storage to acquire a horizon coordinate; and a tide height determination function of determining whether or not the horizon coordinate exceeds a maximum height of a horizon at a normal time, which is forecast from an observation result.

[Supplementary Note 26]

An anomalous tide level fluctuation sensing program according to Supplementary Note 25, in which the anomalous tide level fluctuation sensing program further causes the computer to implement:

a horizontal edge extraction function of carrying out horizontal edge extraction by using a filter for the frame image to generate a current-frame horizontal edge intensity image;

an edge intensity histogram generation function of generating a current-frame edge intensity histogram from the generated current-frame horizontal edge intensity image;

a histogram smoothing function of generating a latest edge intensity histogram by temporally smoothing the generated current-frame edge intensity histogram with reference to the storage; and a maximum intensity position acquiring function of determining a bin of a histogram having a maximum intensity in the latest edge intensity histogram to produce a latest horizon candidate coordinate.

[Supplementary Note 27]

An anomalous tide level fluctuation sensing program according to Supplementary Note 26, in which the anomalous tide level fluctuation sensing program further causes the computer to implement the functions of:

receiving the latest horizon candidate coordinate, referring to the storage, and producing the latest horizon candidate coordinate as the horizon coordinate when a past horizontal edge height is not stored in the storage; and obtaining a difference between the latest horizon candidate coordinate and the past horizontal edge height when the past horizontal edge height is stored in the storage, and producing the latest horizon candidate coordinate as the horizon coordinate when the difference is equal to or smaller than a threshold value set so as to prevent a steep fluctuation.

[Supplementary Note 28]

An anomalous tide level fluctuation sensing program according to any one of Supplementary Notes 25 to 27, in which the anomalous tide level fluctuation sensing program further causes the computer to implement:

a normal-time tide level determination function of determining whether or not the acquired horizon coordinate is above a normal-time maximum tide level stored in the storage on an image, and determining presence or absence of an occurrence of an anomalous tide level fluctuation;

an alert determination function of issuing an instruction to produce caution information indicating that the anomalous tide level fluctuation has occurred when it is determined that the anomalous tide level fluctuation has occurred; and a normal-time maximum tide height estimation function of predicting the normal-time maximum tide level to be exhibited N seconds after a present time based on a determined tide level and based on a horizon height history and a time period history that are stored in the storage, and storing the normal-time maximum tide level to be exhibited N seconds after the present time.

[Supplementary Note 29]

An anomalous tide level fluctuation sensing program for causing a computer to implement:

a horizon-linked object detecting function of detecting a horizon-linked object expected to exhibit vertical motion in association with vertical motion of a horizon within a video to produce a position of the horizon-linked object;

an object tracking function of conducting object tracking by associating an object detected in a past with an object detected from within the video to produce object tracking results; and an object identifying function of identifying a best candidate object closer to a detection target from among the object tracking results to produce a position of the best candidate object.

[Supplementary Note 30]

An anomalous tide level fluctuation sensing program for causing a computer to use the function of detecting the horizon of Supplementary Note 25 and the function of detecting the horizon-linked object of Supplementary Note 29 in combination to implement the functions, wherein the anomalous tide level fluctuation sensing program further causes the computer to implement a function of detecting motion of a horizon or an object exhibiting vertical motion in association with a tide level fluctuation, and sensing an anomalous tide level fluctuation based on a result of the motion of both or one of the horizon and the object.

REFERENCE SIGNS LIST 1 image pickup unit
2 data processor
21 horizon candidate detecting unit
211 horizontal edge extraction unit
212 edge intensity histogram generation unit
213 histogram smoothing unit
214 maximum intensity position acquiring unit
22 horizontal edge height tracking unit
23 tide height determination unit
231 normal-time tide level determination unit
232 alert determination unit
233 normal-time maximum tide height estimation unit
24 horizon-linked object detecting unit
25 object tracking unit
26 object identifying unit
3 alarm output unit
4 storage
41 histogram storage unit
42 horizontal edge height storage unit
43 normal-time maximum tide level storage unit
44 past tide level storage unit
45 tracked object history

What is claimed is:

1. An anomalous tide level fluctuation sensing device, comprising:

an image pickup unit configured to photograph a video, the image pickup unit including a super-telephoto lens and is set at a position that allows a tide level fluctuation in a distance to be observed as vertical motion of a horizon;

a horizon candidate detecting circuitry configured to detect a horizon candidate based on horizontal edge information within a frame image of the video;

a horizontal edge height tracking circuitry configured to compare the detected horizon candidate with a past edge height stored in a storage to acquire a horizon coordinate; and a tide height determination circuitry configured to determine whether or not the horizon coordinate exceeds a maximum height of the horizon at a normal time, which is forecast from an observation result.

2. The anomalous tide level fluctuation sensing device according to claim 1, wherein the horizon candidate detecting unit comprises:

a horizontal edge extraction circuitry configured to carry out horizontal edge extraction by using a filter for the frame image to generate a current-frame horizontal edge intensity image;

an edge intensity histogram generation circuitry configured to generate a current-frame edge intensity histogram from the generated current-frame horizontal edge intensity image;

a histogram smoothing circuitry configured to generate a latest edge intensity histogram by temporally smoothing the generated current-frame edge intensity histogram with reference to the storage; and a maximum intensity position acquiring circuitry configured to determine a bin of a histogram having a maximum intensity in the latest edge intensity histogram to produce a latest horizon candidate coordinate.

3. The anomalous tide level fluctuation sensing device according to claim 2, wherein the horizontal edge height tracking circuitry is further configured to: receive the latest horizon candidate coordinate; refer to the storage; produce the latest horizon candidate coordinate as the horizon coordinate when a past horizontal edge height is not stored in the storage; obtain a difference between the latest horizon candidate coordinate and the past horizontal edge height when the past horizontal edge height is stored in the storage; and produce the latest horizon candidate coordinate as the horizon coordinate when the difference is equal to or smaller than a threshold value set so as to prevent a steep fluctuation.

4. The anomalous tide level fluctuation sensing device according to claim 1, wherein the tide height determination unit comprises:

a normal-time tide level determination circuitry configured to determine whether or not the acquired horizon coordinate is above a normal-time maximum tide level stored in the storage on an image, and determine presence or absence of an occurrence of an anomalous tide level fluctuation;

an alert determination circuitry configured to issue an instruction to produce caution information indicating that the anomalous tide level fluctuation has occurred when it is determined that the anomalous tide level fluctuation has occurred; and a normal-time maximum tide height estimation circuitry configured to predict the normal-time maximum tide level to be exhibited N seconds after a present time based on a determined tide level and based on a horizon height history and a time period history that are stored in the storage, and store the normal-time maximum tide level to be exhibited N seconds after the present time.

5. The anomalous tide level fluctuation sensing device according to claim 1, further comprising:
   a horizon-linked object detecting circuitry configured to detect a horizon-linked object expected to exhibit vertical motion in association with vertical motion of a horizon within the video to produce a position of the horizon-linked object;
   an object tracking circuitry configured to conduct object tracking by associating an object detected in a past with an object detected from within the video to produce object tracking results; and
   an object identifying circuitry configured to identify a best candidate object closer to a detection target from among the object tracking results to produce a position of the best candidate object.

6. An anomalous tide level fluctuation sensing method, comprising:
   photographing a video using an image pickup unit which includes a super-telephoto lens and which is set at a position that allows a tide level fluctuation in a distance to be observed as vertical motion of a horizon;
   detecting a horizon candidate based on horizontal edge information within a frame image of the video;
   comparing the detected horizon candidate with a past edge height stored in a storage to acquire a horizon coordinate; and
   determining whether or not the horizon coordinate exceeds a maximum height of the horizon at a normal time, which is forecast from an observation result.

7. The anomalous tide level fluctuation sensing method according to claim 6, said detecting comprising:
   carrying out horizontal edge extraction by using a filter for the frame image to generate a current-frame horizontal edge intensity image;
   generating a current-frame edge intensity histogram from the generated current-frame horizontal edge intensity image;
   generating a latest edge intensity histogram by temporally smoothing the generated current-frame edge intensity histogram with reference to the storage; and
   determining a bin of a histogram having a maximum intensity in the latest edge intensity histogram to produce a latest horizon candidate coordinate.

8. The anomalous tide level fluctuation sensing method according to claim 7, said comparing comprising: receiving the latest horizon candidate coordinate; referring to the storage; producing the latest horizon candidate coordinate as the horizon coordinate when a past horizontal edge height is not stored in the storage; obtaining a difference between the latest horizon candidate coordinate and the past horizontal edge height when the past horizontal edge height is stored in the storage; and producing the latest horizon candidate coordinate as the horizon coordinate when the difference is equal to or smaller than a threshold value set so as to prevent a steep fluctuation.

9. The anomalous tide level fluctuation sensing method according to claim 6, further comprising:
   determining whether or not the acquired horizon coordinate is above a normal-time maximum tide level stored in the storage on an image, and determining presence or absence of an occurrence of an anomalous tide level fluctuation;
   issuing an instruction to produce caution information indicating that the anomalous tide level fluctuation has occurred when it is determined that the anomalous tide level fluctuation has occurred; and
   predicting the normal-time maximum tide level to be exhibited N seconds after a present time based on a determined tide level and based on a horizon height history and a time period history that are stored in the storage, and storing the normal-time maximum tide level to be exhibited N seconds after the present time.

10. The anomalous tide level fluctuation sensing method according to claim 6, further comprising:
    detecting a horizon-linked object expected to exhibit vertical motion in association with vertical motion of a horizon within the video to produce a position of the horizon-linked object;
    conducting object tracking by associating an object detected in a past with an object detected from within the video to produce object tracking results; and
    identifying a best candidate object closer to a detection target from among the object tracking results to produce a position of the best candidate object.

11. A non-transitory computer readable recording medium storing an anomalous tide level fluctuation sensing program for causing a computer to implement:
    a photographing function of photographing a video using an image pickup unit which includes a super-telephoto lens and which is set at a position that allows a tide level fluctuation in a distance to be observed as vertical motion of a horizon;
    a horizon candidate detecting function of detecting a horizon candidate based on horizontal edge information within a frame image of the video;
    a horizontal edge height tracking function of comparing the detected horizon candidate with a past edge height stored in a storage to acquire a horizon coordinate; and
    a tide height determination function of determining whether or not the horizon coordinate exceeds a maximum height of the horizon at a normal time, which is forecast from an observation result.

12. The non-transitory computer readable recording medium according to claim 11, wherein the horizon candidate detecting function comprises:
    a horizontal edge extraction function of carrying out horizontal edge extraction by using a filter for the frame image to generate a current-frame horizontal edge intensity image;
    an edge intensity histogram generation function of generating a current-frame edge intensity histogram from the generated current-frame horizontal edge intensity image;
    a histogram smoothing function of generating a latest edge intensity histogram by temporally smoothing the generated current-frame edge intensity histogram with reference to the storage; and
    a maximum intensity position acquiring function of determining a bin of a histogram having a maximum intensity in the latest edge intensity histogram to produce a latest horizon candidate coordinate.

13. The non-transitory computer readable recording medium according to claim 12, wherein the horizontal edge height tracking function causes the computer to implement the functions of:
    receiving the latest horizon candidate coordinate, referring to the storage, and producing the latest horizon candidate coordinate as the horizon coordinate when a past horizontal edge height is not stored in the storage; and obtaining a difference between the latest horizon candidate coordinate and the past horizontal edge height when the past horizontal edge height is stored in the storage, and producing the latest horizon candidate coordinate as the horizon coordinate when the difference is equal to or smaller than a threshold value set so as to prevent a steep fluctuation.

14. The non-transitory computer readable recording medium according to claim 11, wherein the tide height determination function comprises:

a normal-time tide level determination function of determining whether or not the acquired horizon coordinate is above a normal-time maximum tide level stored in the storage on an image, and determining presence or absence of an occurrence of an anomalous tide level fluctuation;

an alert determination function of issuing an instruction to produce caution information indicating that the anomalous tide level fluctuation has occurred when it is determined that the anomalous tide level fluctuation has occurred; and a normal-time maximum tide height estimation function of predicting the normal-time maximum tide level to be exhibited N seconds after a present time based on a determined tide level and based on a horizon height history and a time period history that are stored in the storage, and storing the normal-time maximum tide level to be exhibited N seconds after the present time.

15. The non-transitory computer readable recording medium according to claim 11, wherein the anomalous tide level function sensing program further causes the computer to implement:

a horizon-linked object detecting function of detecting a horizon-linked object expected to exhibit vertical motion in association with vertical motion of a horizon within the video to produce a position of the horizon-linked object;

an object tracking function of conducting object tracking by associating an object detected in a past with an object detected from within the video to produce object tracking results; and an object identifying function of identifying a best candidate object closer to a detection target from among the object tracking results to produce a position of the best candidate object.

* * * * *